United States Patent
Hong et al.

(10) Patent No.: US 8,803,434 B2
(45) Date of Patent: Aug. 12, 2014

(54) APPARATUS FOR CONTROLLING BLEED SWITCH, POWER SUPPLY, AND METHOD FOR DRIVING POWER SUPPLY

(75) Inventors: Seung Woo Hong, Seoul (KR); Gye-Hyun Cho, Bucheon (KR); Young-Je Lee, Bucheon (KR); Jae-yong Lee, Seongnam (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 338 days.

(21) Appl. No.: 13/238,944

(22) Filed: Sep. 21, 2011

(65) Prior Publication Data

US 2012/0176055 A1  Jul. 12, 2012

(30) Foreign Application Priority Data

Jan. 10, 2011  (KR) .................. 10-2011-0002378

(51) Int. Cl.
*H05B 37/02*  (2006.01)

(52) U.S. Cl.
USPC .................. 315/209 R; 315/225; 315/294

(58) Field of Classification Search
USPC ............. 315/119, 200 R, 209 R, 224–226, 315/287–288, 291, 294, 362
See application file for complete search history.

(56) References Cited

U.S. PATENT DOCUMENTS

| | | | | |
|---|---|---|---|---|
| 4,234,819 A * | 11/1980 | Maxey | ................... | 315/119 |
| 5,512,810 A * | 4/1996 | Hansen et al. | ............... | 318/800 |
| 2011/0080118 A1* | 4/2011 | Daniel | ................. | 315/297 |
| 2011/0140620 A1* | 6/2011 | Lin et al. | .................. | 315/224 |
| 2011/0193494 A1* | 8/2011 | Gaknoki et al. | ............... | 315/297 |
| 2012/0249018 A1* | 10/2012 | West | ......................... | 315/362 |

OTHER PUBLICATIONS

LM3445 Triac Dimmable Offline LED Driver, Sep. 22, 2010, pp. 1-26, National Semiconductor Corporation.
SSL2101—SMPS IC for dimmable LED lightning, Aug. 28, 2009, pp. 1-22, Rev. 04 Product data sheet, NXP Semiconductors, NXP founded by Philips.

* cited by examiner

*Primary Examiner* — Tung X Le
(74) *Attorney, Agent, or Firm* — Okamoto & Benedicto LLP

(57) ABSTRACT

A power supply has a TRIAC dimmer, and an AC-DC converter connected to the TRIAC dimmer. The AC-DC converter has a power switch, a bleed switch, and a controller. The controller turns off the bleed switch in a first time duration and turns on the bleed switch in a second time duration. Magnitude of a current of the power switch in the first time duration is larger than magnitude of a current of the power switch in the second time duration. Magnitude of a current of the bleed switch in a third time duration within the second time duration is smaller than magnitude of a current of the bleed switch in a fourth time duration within the second time duration.

16 Claims, 8 Drawing Sheets

APPARATUS FOR CONTROLLING BLEED SWITCH, POWER SUPPLY, AND METHOD FOR DRIVING POWER SUPPLY

CROSS-REFERENCE TO RELATED APPLICATION

This application claims priority to and the benefit of Korean Patent Application No. 10-2011-0002378 filed in the Korean Intellectual Property Office on Jan. 10, 2011, the entire contents of which are incorporated herein by reference.

BACKGROUND OF THE INVENTION (a) Field of the Invention

The present invention relates to a power supply. In particular, the present invention relates to a power supply including a bleed switch for an LED lamp which is controlled by a TRIAC dimmer.

(b) Description of the Related Art

The TRIAC dimmer is widely used for controlling a current provided to a load. Referring to FIG. 1 and FIG. 2, the TRIAC dimmer will be described.

FIG. 1 is a schematic diagram representing a prior circuit including a TRIAC dimmer, and FIG. 2 is a waveform diagram showing an operation of the TRIAC dimmer.

As shown in FIG. 1, the TRIAC dimmer 10 is connected in series to an AC power source Vac and a load 20. The TRIAC dimmer 10 includes a variable resistor R1, a resistor R2, a capacitor C1, a DIAC, and a TRIAC.

The AC power source Vac provides a voltage source with an AC waveform as shown in FIG. 2 (A). An RC network consisting of the variable resistor R1, the resistor R2, and the capacitor C1 delays turn-on of the TRIAC until a voltage of the capacitor C1 reaches a trigger voltage of the DIAC. From this, two terminals of the load 20 are provided with a voltage with a waveform as shown in FIG. 2 (B).

In the other hand, if resistance of the variable resistor R1 increases, the delay of turn-on of the TRIAC also increases. That is, because on-time of the TRIAC reduces, an average power provided to the load 20 reduces.

In this way, when the TRIAC dimmer 10 is used, a power provided to the load 20 can be controlled by controlling a value of the variable resistor R1.

In particular, in a case that the load 20 corresponds to an AC-DC converter and an LED lamp, if on-time of the TRIAC is shorter than a certain time, flicker can be caused. A constant current is required to continuously flow to prevent this problem. This current is called a bleed current.

However, efficiency of the AC-DC converter worsens because of the continuous current.

SUMMARY OF THE INVENTION

Embodiments of the present invention provide a power supply having advantages of improving efficiency.

An embodiment of the present invention provides a device for controlling a bleed switch, including: a first controller for generating a first control signal having a first level in a first time duration and having a second level in a second time duration; and a second controller for generating a second control signal by using the first control signal and providing the second control signal to the bleed switch, wherein the bleed switch is turned off in the first time duration, and wherein the bleed switch is turned on in the second time duration.

Magnitude of a current of a power switch in the first time duration may be larger than magnitude of a current of the power switch in the second time duration.

The second control signal may have a third level in the first time duration, have a fourth level in a third time duration within the second time duration, and have a fifth level in a fourth time duration within the second time duration.

Magnitude of a current of the power switch in the third time duration may be larger than magnitude of a current of the power switch in the fourth time duration.

Magnitude of a current of the bleed switch in the fourth level may be smaller than magnitude of a current of the bleed switch in the fifth level.

The second controller may include a sampler for sampling a voltage corresponding to a current of the power switch to output a sampling signal; an inverter for inverting the sampling signal to generate an inverted signal; and a third controller for generating the second control signal by using the first control signal and the inverted signal.

The third controller may include a clock generator for generating a clock signal by using a control signal of the power switch; a tracker for generating a tracking signal, wherein the tracking signal has a third level when the first control signal has the first level and has a level of the sampling signal corresponding to an edge of the clock signal when the first control signal has the second level; and an amplifier for amplifying the tracking signal to generate the second control signal.

The sampling signal may have a level corresponding to a current of the power switch just before the power switch is turned off when a condition of the power switch corresponds to a turn-off.

The sampling signal may have a level corresponding to a current of the power switch when a condition of the power switch corresponds to a turn-on.

Another embodiment of the present invention provides a power supply, including: a TRIAC dimmer; and an AC-DC converter connected to the TRIAC dimmer, wherein the AC-DC converter includes a power switch; a bleed switch; and a bleed switch controller for turning off the bleed switch in a first time duration and turning on the bleed switch in a second time duration.

Magnitude of a current of the power switch in the first time duration may be larger than magnitude of a current of the power switch in the second time duration.

The bleed switch controller may control the bleed switch so that magnitude of a current of the bleed switch in a third time duration within the second time duration is smaller than magnitude of a current of the bleed switch in a fourth time duration within the second time duration.

Magnitude of a current of the power switch in the third time duration may be larger than magnitude of a current of the power switch in the fourth time duration.

Yet another embodiment of the present invention provides a method of driving a power supply of which consumption power is controlled by a TRIAC dimmer, wherein the power supply includes a bleed switch, the method including: generating a first control signal having a first level in a first time duration and having a second level in a second time duration; generating a second control signal by using the first control signal; and providing the second control signal to the bleed switch, wherein the bleed switch is turned off in the first time duration, and wherein the bleed switch is turned on in the second time duration.

Magnitude of a current of a power switch in the first time duration may be larger than magnitude of a current of the power switch in the second time duration.

The second control signal may have a third level in the first time duration, have a fourth level in a third time duration within the second time duration, and have a fifth level in a fourth time duration within the second time duration.

Magnitude of a current of the power switch in the third time duration may be larger than magnitude of a current of the power switch in the fourth time duration.

Magnitude of a current of the bleed switch in the fourth level may be smaller than magnitude of a current of the bleed switch in the fifth level.

generating the second control signal may include generating a sampling signal, wherein the sampling signal has a level corresponding to a current of the power switch just before the power switch is turned off when a condition of the power switch corresponds to a turn-off and has a level corresponding to a current of the power switch when a condition of the power switch corresponds to a turn-on; inverting the sampling signal to generate an inverted signal; generating a clock signal by using a control signal of the power switch; generating a tracking signal, wherein the tracking signal has a third level when the first control signal has the first level, and has a level of the sampling signal corresponding to an edge of the clock signal when the first control signal has the second level; and amplifying the tracking signal to generate the second control signal.

DETAILED DESCRIPTION OF THE EMBODIMENTS

Figure 1:
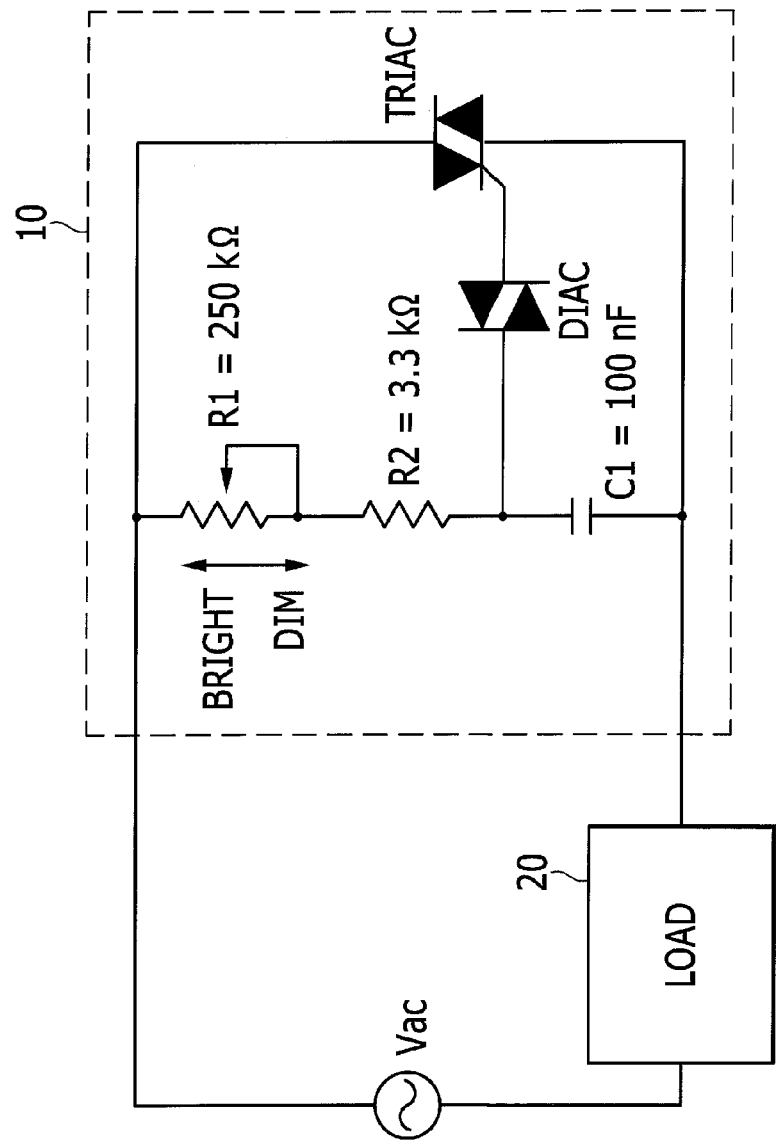
FIG. 1 is a schematic diagram representing a prior circuit including a TRIAC dimmer.
Figure 2:
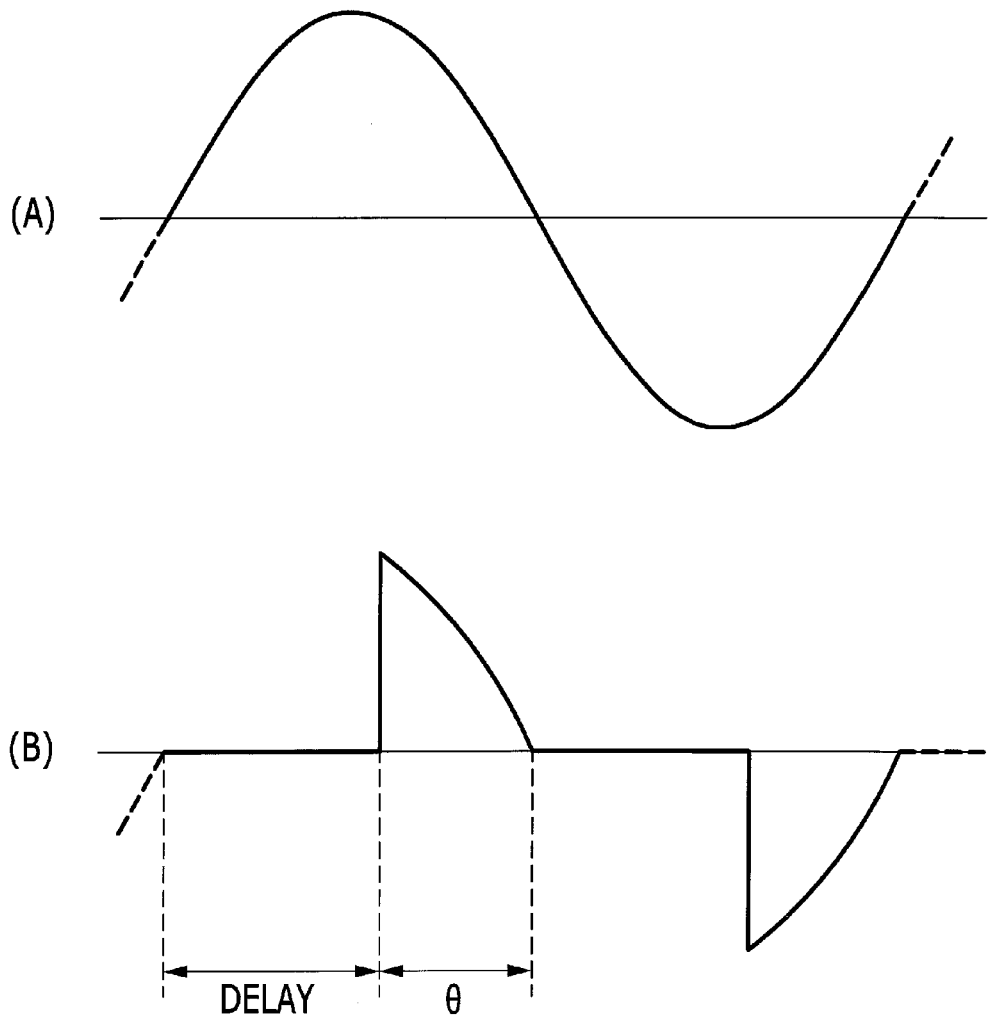
FIG. 2 is a waveform diagram showing an operation of the TRIAC dimmer.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

In addition, unless explicitly described to the contrary, the word "comprise" and variations such as "comprises" or "comprising" will be understood to imply the inclusion of stated elements but not the exclusion of any other elements.

Next, referring to FIG. 3 to FIG. 8, a power supply according to an embodiment of the present invention will be described.

Figure 3:
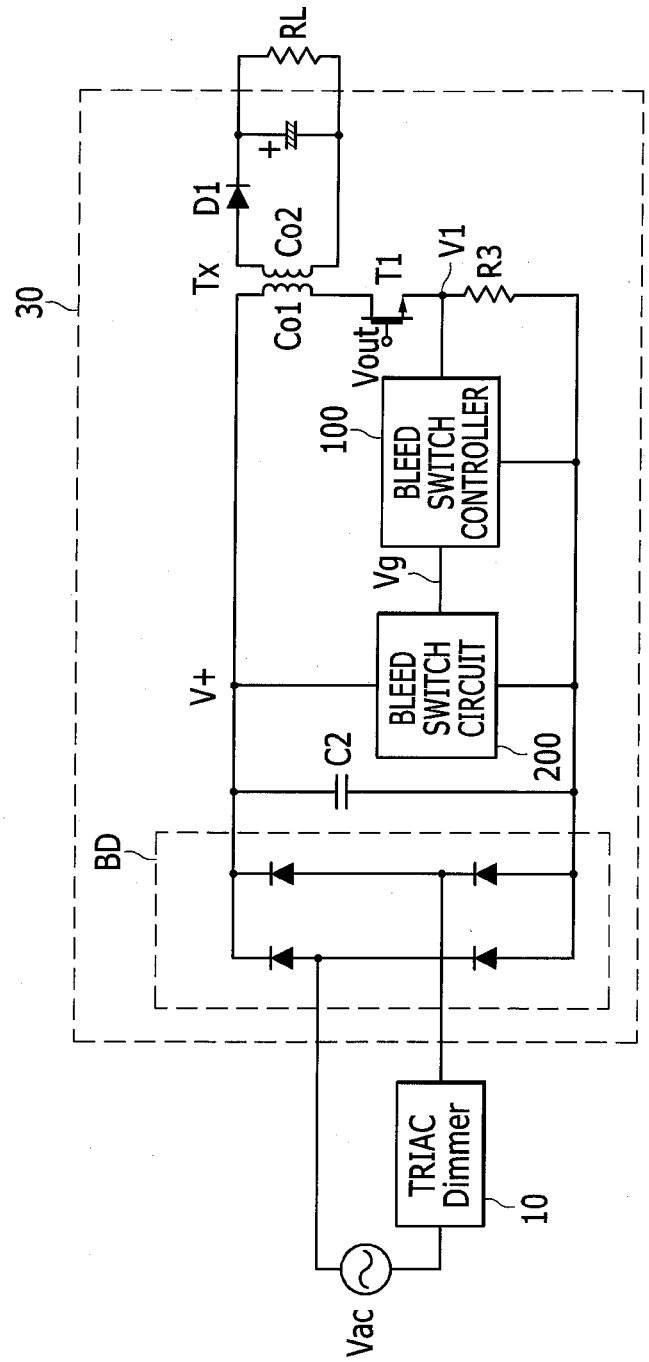
FIG. 3 is a schematic diagram representing a circuit including an AC-DC converter according to an embodiment of the present invention.

FIG. 3 is a schematic diagram representing a circuit including an AC-DC converter according to an embodiment of the present invention.

As shown in FIG. 3, the AC-DC converter 30 according to an embodiment of the present invention has an input terminal connected in series to the AC power source Vac and a TRIAC dimmer 10, and an output terminal connected to a load RL.

The AC-DC converter 30 includes a bridge diode BD, an input capacitor C2, a bleed switch circuit 200, a bleed switch controller 100, a power switch T1, a resistor R3, a transformer TX, and a diode D1.

The bridge diode BD consists of four diodes, and has two input terminals that are connected to the AC power source Vac and the TRIAC dimmer 10, respectively, and two output terminals outputting a rectified AC voltage V+.

The input capacitor C2 is connected to the rectified AC voltage V+, stabilizes the rectified AC voltage V+, and reduces electromagnetic interference (EMI).

The bleed switch controller 100 generates a bleed switch control signal Vg by using a source voltage V1 of the power switch T1.

The transformer TX includes a primary coil Co1 and a secondary coil Co2. One terminal of the primary coil Co1 is connected to one of two output terminals of the bridge diode BD, and the other terminal of the primary coil Co1 is connected to a drain electrode of the power switch T1. One terminal of the secondary coil Co2 is connected to an anode of the diode D1. One terminal of the load RL is connected to a cathode of the diode D1, and the other terminal of the load RL is connected to the other terminal of the secondary coil Co2.

A gate electrode of the power switch T1 is provided with a power switch control signal Vout, and a source electrode of the power switch T1 is connected to one terminal of the resistor R3.

Next, referring to FIG. 4 and FIG. 5, a bleed switch controller 100 and a bleed switch circuit 200 according to an embodiment of the present invention will be described. In particularly, the bleed switch controller 100 as shown in FIG. 4 and FIG. 5 can be embodied by one integrated circuit, but it is unnecessary to limit the present invention like this.

Figure 4:
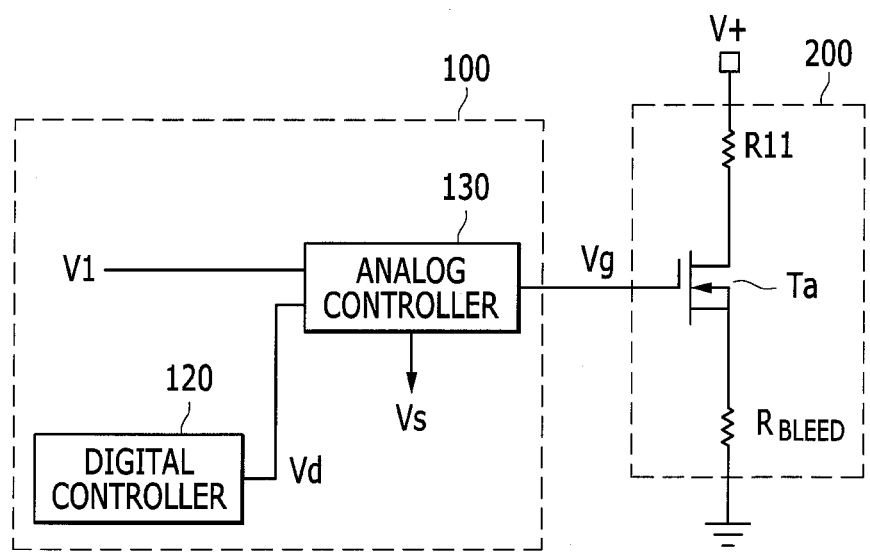
FIG. 4 is a schematic diagram representing a bleed switch controller and a bleed switch circuit according to an embodiment of the present invention.
Figure 5:
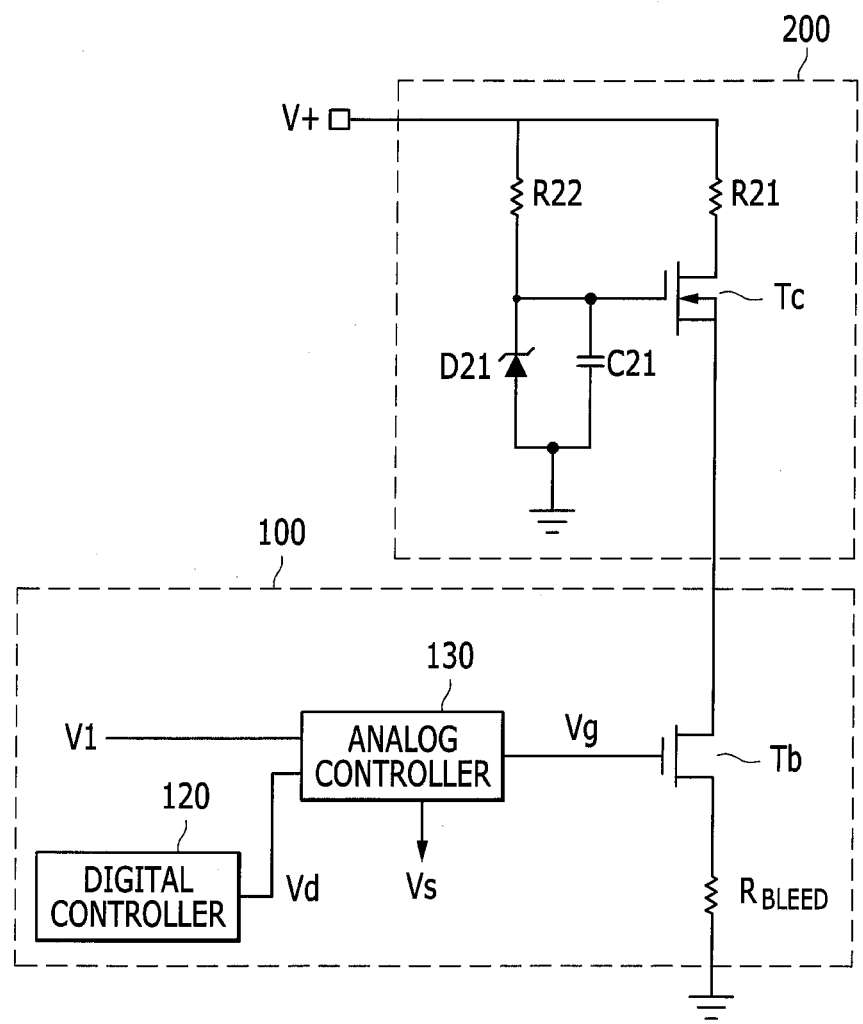
FIG. 5 is a schematic diagram representing a bleed switch controller and a bleed switch circuit according to another embodiment of the present invention.

FIG. 4 is a schematic diagram representing a bleed switch controller and a bleed switch circuit according to an embodiment of the present invention.

As shown in FIG. 4, the bleed switch controller 100 includes a digital controller 120 and an analog controller 130, and the bleed switch circuit 200 includes a resistor R11, a high voltage switch Ta, and a bleed resistor $R_{BLEED}$.

The digital controller 120 generates a bleed switch on-off control signal Vd. The analog controller 130 with the source voltage V1 of the power switch T1 and the bleed switch on-off control signal Vd as inputs generates the bleed switch control signal Vg.

According to the embodiment of FIG. 4, the high voltage switch Ta has a drain electrode connected to one terminal of the resistor R11, a gate electrode connected to the bleed switch control signal Vg, and a source electrode connected to one terminal of the bleed resistor $R_{BLEED}$. The resistor R11 has one terminal connected to the drain electrode of the high voltage switch Ta, and the other terminal connected to the rectified AC voltage V+.

FIG. 5 is a schematic diagram representing a bleed switch controller and a bleed switch circuit according to another embodiment of the present invention.

As shown in FIG. 5, the bleed switch controller 100 includes a digital controller 120, an analog controller 130, a low voltage NMOS transistor Tb, and a bleed resistor $R_{BLEED}$. In this case, to prevent the low voltage NMOS transistor Tb from being provided with a high voltage, a bleed switch circuit 200 having a high voltage switch Tc, a resistor R21, a resistor R22, a zener diode D21, and a capacitor C21 is connected to the low voltage NMOS transistor Tb.

The digital controller 120 generates the bleed switch on-off control signal Vd. The analog controller 130 with the source voltage V1 of the power switch T1 and the bleed switch on-off control signal Vd as inputs generates the bleed switch control signal Vg.

The low voltage NMOS transistor Tb according to the embodiment of FIG. 5 has a drain electrode connected to a source electrode of the high voltage switch Tc, a gate electrode connected to the bleed switch control signal Vg, and a source electrode connected to one terminal of bleed resistor $R_{BLEED}$. The high voltage switch Tc has a drain electrode connected to one terminal of the resistor R21, a gate electrode connected to one terminal of the capacitor C21, and the source electrode connected to the drain electrode of the low voltage NMOS transistor Tb. The resistor R21 has one terminal connected to the source electrode of the high voltage switch Tc and the other terminal connected to the rectified AC voltage V+. The resistor R22 has one terminal connected to one terminal of the capacitor C21 and the other terminal connected to the rectified AC voltage V+. The capacitor C21 has one terminal connected to the gate electrode of the high voltage switch Tc and the other terminal connected to ground. The zener diode D21 has an anode connected to one terminal of capacitor 21 and a cathode connected to ground.

Next, referring to FIG. 6, the bleed switch controller 100 according to an embodiment of the present invention will be described.

Figure 6:
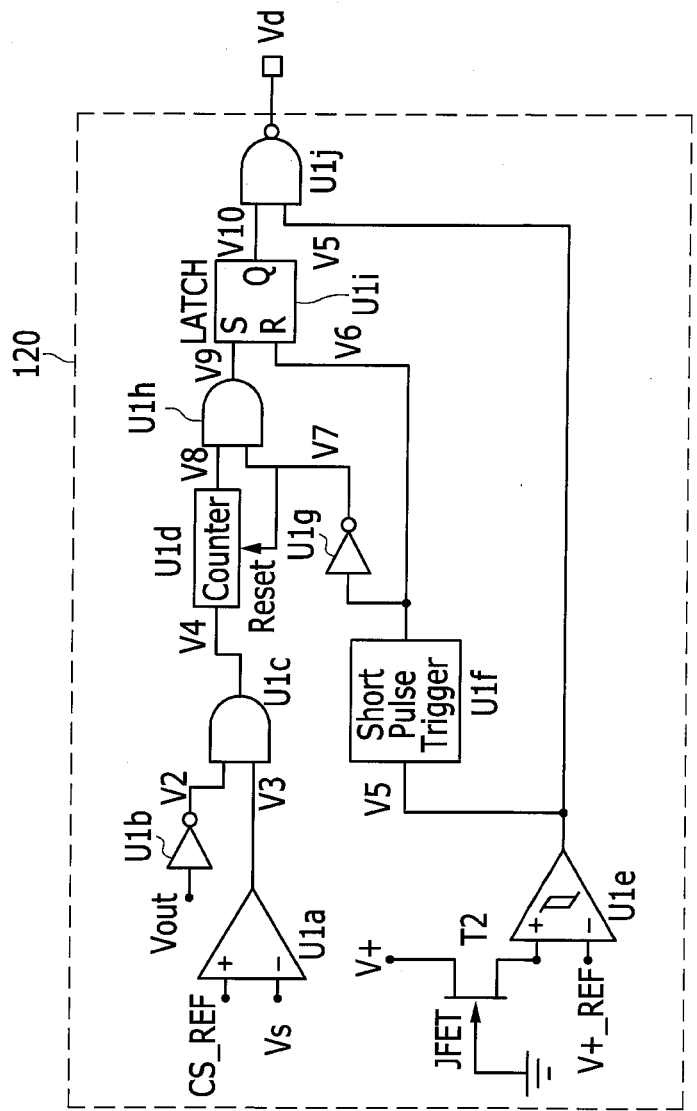
FIG. 6 is a schematic diagram representing a circuit of a digital controller according to an embodiment of the present invention.

FIG. 6 is a schematic diagram representing a circuit of a digital controller according to an embodiment of the present invention.

The digital controller 120 generates the bleed switch on-off control signal Vd. For example, the bleed switch on-off control signal Vd can have two levels. If the bleed switch on-off control signal. Vd corresponds to one of two levels, the bleed switch circuit 200 is turned on. Otherwise, if the bleed switch on-off control signal Vd corresponds to the other one of two levels, the bleed switch circuit 200 can be turned off. In an embodiment of the present invention, if the bleed switch on-off control signal Vd corresponds to the high level, the bleed switch circuit 200 is turned off, which will be described below.

As shown in FIG. 6, the digital controller 120 includes a transistor T2, a comparator U1a, a NOT gate U1b, an AND gate U1c, a counter U1d, a comparator U1e, a short pulse trigger U1f, a NOT gate U1g, an AND gate U1h, a latch U1i, and a NAND gate U1j.

The comparator U1a has a non-inverted terminal (+) connected to a reference voltage CS_REF, an inverted terminal (−) connected to a sampling signal Vs outputted by the analog controller 130, and an output terminal. The NOT gate U1b has an input terminal connected to the power switch control signal Vout and an output terminal. The AND gate U1c has two input terminals and an output terminal. The two input terminals of the AND gate U1c are connected to the output terminal of the comparator U1a and the output terminal of the NOT gate U1b, respectively. The counter U1d has an input terminal connected to the output terminal of the AND gate U1c, a reset terminal connected to an output terminal of a NOT gate U1h, and an output terminal. The transistor T2 has a drain electrode connected to the rectified AC voltage V+, a gate electrode connected to ground, and a source electrode. The comparator U1e has a non-inverted terminal (+) connected to the source electrode of the transistor T2, an inverted terminal (−) connected to a reference voltage V+_REF, and an output terminal. The short pulse trigger U1f has an input terminal connected to the output terminal of the comparator U1e and an output terminal. The NOT gate U1g has an input terminal connected to the output terminal of the short pulse trigger U1f and an output terminal. The AND gate U1h has two input terminals and an output terminal. The two input terminals of the AND gate U1h are connected to the output terminal of the counter U1d and the output terminal of NOT gate U1g, respectively. The latch U1i has a set terminal S connected to the output terminal of the AND gate U1h, a reset terminal R connected to the output terminal of the short pulse trigger U1f, and an output terminal Q. The NAND gate U1j has two input terminals and an output terminal. The two input terminal of the NAND gate U1j are connected to the output terminal Q of the latch U1i and the output terminal of the comparator U1e, respectively. The output terminal of the NAND gate U1j outputs the bleed switch on-off control signal Vd. An operation of the digital controller 120 will be described below.

Figure 7:
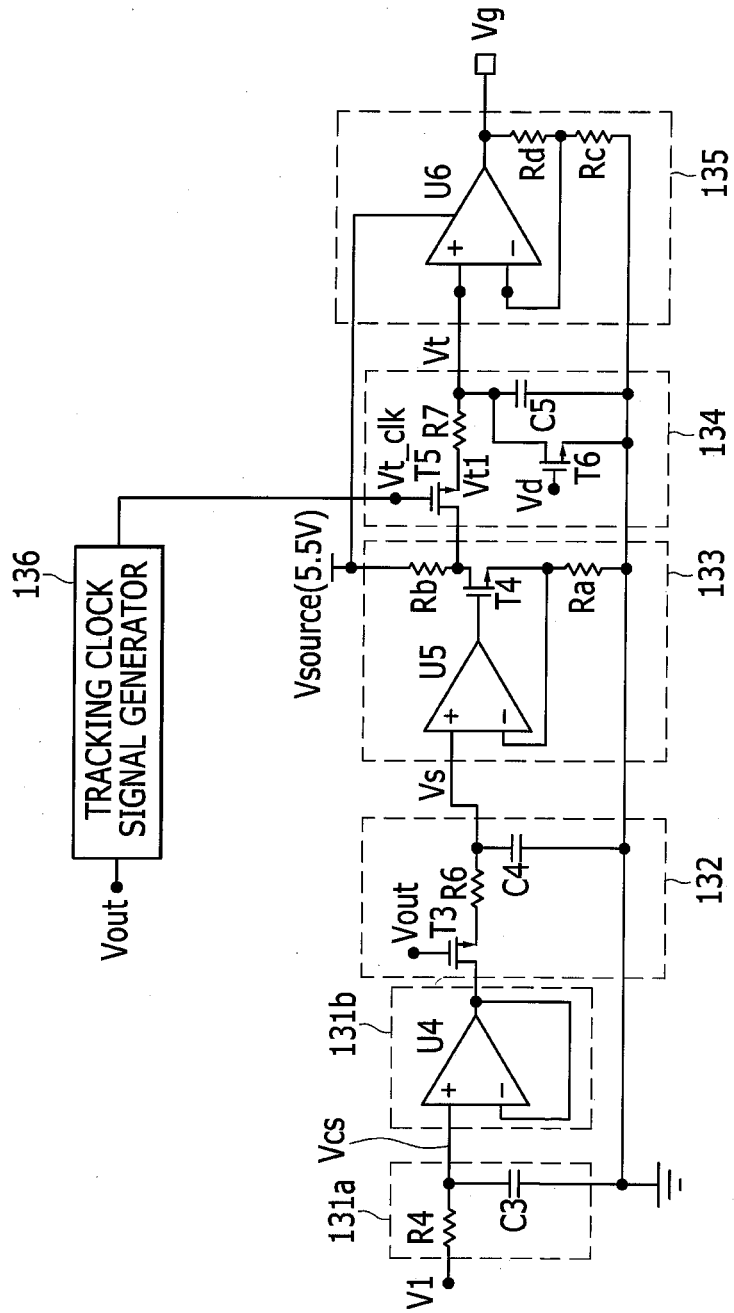
FIG. 7 is a schematic diagram representing a circuit of an analog controller according to an embodiment of the present invention.

FIG. 7 is a schematic diagram representing a circuit of an analog controller according to an embodiment of the present invention.

The analog controller 130 with the source voltage V1 of the power switch T1 and the bleed switch on-off control signal Vd as inputs generates the bleed switch control signal Vg.

As shown in FIG. 7, the analog controller 130 according to an embodiment of the present invention includes a low-pass filter 131a, an analog buffer 131b, a sampler 132, an inverting amplifier 133, a tracker 134, an amplifier 135, and a tracking clock signal generator 136.

The low-pass filter 131a low-pass-filters the source voltage V1 of the power switch T1 to output a filtered signal Vcs. The low-pass filter 131a can be used for remove a noise of the source voltage V1 of the power switch T1. The low-pass filter 131a according to an embodiment of the present invention includes a resistor R4 and a capacitor C3. The resistor R4 has one terminal connected to the source electrode of the power switch T1 and the other terminal connected to one terminal of the capacitor C3. The capacitor C3 has one terminal connected to the other terminal of the resistor R4 and the other terminal connected to ground. The one terminal of the capacitor C3 outputs the filtered signal Vcs.

The analog buffer 131b can be used so that a change of impedance does not cause a change of the filtered signal Vcs. The analog buffer 131b includes an operational (OP) amplifier U4. The OP amplifier U4 has a non-inverted terminal (+) connected to the filtered signal Vcs, an inverted terminal (−) connected to the output terminal of the OP amplifier U4, and an output terminal outputting a buffered signal.

The sampler 132 samples an output voltage of the analog buffer 131 to generate the sampling signal Vs. The sampler 132 includes a transistor T3, a resistor R6, and a capacitor C4. The transistor T3 has a drain electrode connected to the output terminal of the OP amplifier U4 and a gate electrode connected to the power switch control signal Vout. The resistor R6 has one terminal connected to a source electrode of the transistor T3 and the other terminal connected to one terminal of the capacitor T4. The capacitor T4 has one terminal outputting the sampling signal Vs and the other terminal connected to ground.

The inverting amplifier 133 inverts a phase of the sampling signal Vs to output an inverted sampling signal. The inverting amplifier 133 includes an OP amplifier U5, a transistor T4, a resistor Ra, and a resistor Rb. The OP amplifier U5 has a non-inverted terminal (+) provided with the sampling signal Vs, an inverted terminal (−) connected to a source electrode of the transistor T4, and an output terminal connected to a gate electrode of the transistor T4. The transistor T4 has a drain electrode connected to one terminal of the resistor Ra and outputting the inverted sampling signal, a gate electrode connected to the output terminal of the OP amplifier U5, and a source electrode connected to one terminal of the resistor Ra. The resistor Ra has one terminal connected to the drain electrode of the transistor T4 and the other terminal connected to a voltage Vsource. The resistor Rb has one terminal connected to the source electrode of the transistor T4 and the other terminal connected to ground.

The tracking clock signal generator 136 generates a tracking clock signal Vt_clk for tracking by using the power switch control signal Vout.

The tracker 134 with the tracking clock signal Vt_clk, the inverted sampling signal outputted by the inverting amplifier 133, and the bleed switch on-off control signal Vd as inputs outputs a tracking signal Vt. The tracker 134 includes a transistor T5, a transistor T6, a resistor R7, and a capacitor C5. The transistor T5 has a drain electrode connected to the drain electrode of the transistor T4, a gate electrode connected to the tracking clock signal Vt_clk, and a source electrode connected to one terminal of the resistor R7. The resistor R7 has one terminal connected to the source electrode of the transistor T5, and the other terminal connected to one terminal of the capacitor C5 and outputting the tracking signal Vt. The transistor T6 has a drain electrode connected to one terminal of the capacitor C5, a gate electrode connected to the bleed switch on-off control signal Vd, and a source electrode connected to ground. The capacitor C5 has one terminal connected to the drain electrode of the transistor T6 and the other terminal connected to ground.

The amplifier 135 amplifies the tracking signal Vt to a suitable magnitude for the bleed switch circuit 200 to output the bleed switch control signal Vg. The amplifier 135 includes an OP amplifier U6, a resistor Rc, and a register Rd. The OP amplifier U6 has a non-inverted terminal (+) connected to the tracking signal Vt, an inverted terminal (−) connected to both one terminal of the resistor Rd and one terminal of the resistor Rc, and an output terminal connected to the other terminal of the resistor Rd and outputting the bleed switch control signal Vg. The resistor Rc has one terminal connected to the inverted terminal (−) of the OP amplifier U6, and the other terminal connected to ground. The resistor Rd has one terminal connected to the inverted terminal (−) of the OP amplifier U6, and the other terminal connected to an output terminal of the OP amplifier U6.

Next, referring to FIG. 8, an operation of the bleed switch controller 100 according to an embodiment of the present invention will be described.

Figure 8:
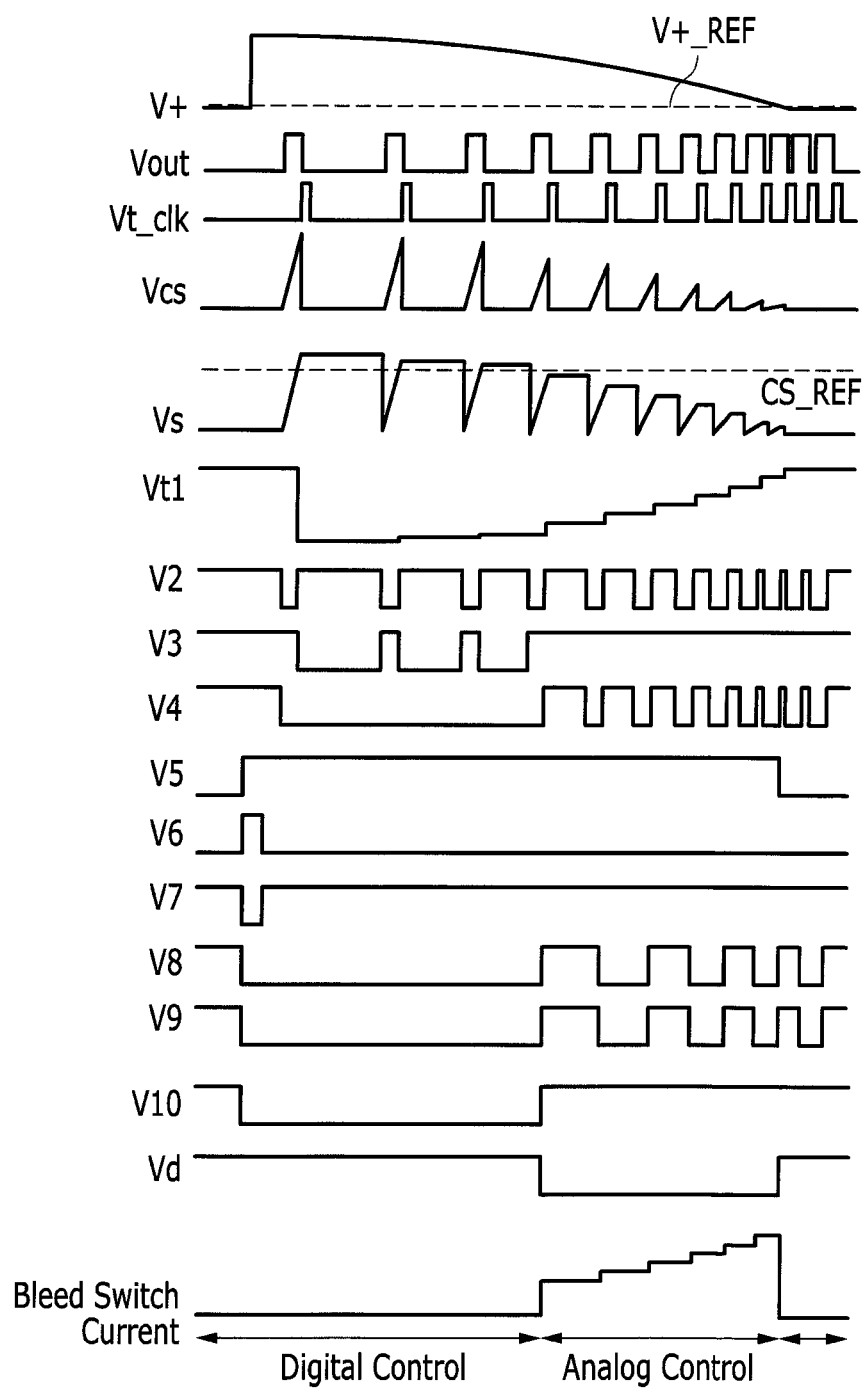
FIG. 8 is a waveform diagram showing an operation of a bleed switch controller according to an embodiment of the present invention.

FIG. 8 is a waveform diagram showing an operation of a bleed switch controller according to an embodiment of the present invention.

First, an operation of the analog controller 130 will be described.

The rectified AC voltage V+ has a waveform as shown in FIG. 8 because of the TRIAC dimmer 10. If magnitude of the rectified AC voltage V+ reduces, an interval between on-time pulses of the power switch T1 also reduces for conversion of a constant power.

Because the primary coil Co1 of the transformer TX increases magnitude of a current in the resistor R3 with a slope of V+/L during a turn-on time of the power switch T1, a waveform of the filtered signal Vcs corresponding to the source voltage V1 of power switch T1 is as shown in FIG. 8. In particular, because magnitude of a voltage provided to the primary coil Co1 is small in a duration when magnitude of the rectified AC voltage V+ is small, a peak value of the filtered signal Vcs is also small.

The analog buffer 131b performs analog buffering of the filtered signal Vcs to output a buffered signal. In a case that the power switch control signal Vout has a high level, the transistor T3 of the sampler 132 is turned on. Therefore, in a duration when the power switch control signal Vout has the high level, the sampling signal Vs is equal to the sum of the output signal of the analog buffer 131b and a drain-source voltage Vds of the transistor T3. On the other hand, in a case that the power switch control signal Vout has a low level, the transistor T3 is turned off, so a charged voltage of the capacitor C4 is equal to magnitude of the sampling signal Vs. Therefore, in a duration when the power switch control signal Vout has the low level, the sampling signal Vs remains at the magnitude of the sampling signal Vs at a falling edge of the power switch control signal Vout.

Next, an operation of the digital controller 120 will be described.

The comparator U1a compares the sampling signal Vs with the reference voltage CS_REF to output a signal V3. Concretely, if the reference voltage CS_REF is larger than the sampling signal Vs, the comparator U1a according to an embodiment of the present invention outputs a high-level signal. Otherwise, the comparator U1a outputs a low-level signal.

The NOT gate U1b inverts the power switch control signal Vout to output a signal V2.

The AND gate U1c performs an AND operation with the output signal V2 of the NOT gate U1b and the output signal V3 of the comparator U1a as inputs, and outputs a signal V4 as shown in FIG. 8. The output signal V4 of the AND gate U1c is a signal that is generated by detecting a condition where the sampling signal Vs is smaller than the reference voltage CS_REF while the power switch control signal Vout has the high level. The output signal V4 is noise-filtered by the counter U1d and the latch U1i.

On the other hand, the comparator U1e compares the rectified AC signal V+ with the reference voltage V+_REF to output a signal V5. Concretely, if the reference voltage V+_REF is larger than the rectified AC signal V+, the comparator U1e outputs a low-level signal. Otherwise, the comparator U1e outputs a high-level signal. The output signal V5 of the comparator U1e is used for turning off the bleed switch circuit 200 when the TRIAC is turned off.

If the TRIAC is triggered, the short pulse trigger U1f generates short pulses at a rising edges of the output signal V5 of the comparator U1e to output a signal V6. The NOT gate U1g inverts the output signal V6 of the short pulse trigger U1f to output a signal V7. The output signal V6 of the short pulse trigger U1f and the output signal V7 of the OT gate U1g are used for resetting the latch U1i and the counter U1d when the TRIAC is triggered, respectively.

The counter U1d outputs a low-level at every falling edge of output signal V7 of the NOT gate U1g and inverts a phase at every rising edge of the output signal V4 of the AND gate U1c to output a signal V8. The AND gate U1h performs an AND operation with the output signal V8 of the counter U1d and the output signal V7 of the NOT gate U1g to output a signal V9 as shown in FIG. 8.

The latch U1i outputs a signal V10 with a high level at every rising edge of the output signal V9 of the AND gate U1h, and outputs a signal V10 with a low level at every rising edge of the output signal V6 of the short pulse trigger U1f.

The NAND gate U1j performs a NAND operation with the output signal V10 of the latch U1i and the output signal V5 of the comparator U1e as inputs, and outputs the bleed switch on-off control signal Vd as shown in FIG. 8.

The operation of the analog controller 130 will be described again.

The inverting amplifier 133 inverts and amplifies the sampling signal Vs with a gain of −Ra/Rb to generate an inverted sampling signal.

On the other hand, the tracking clock signal generator 136 generates a pulse at every falling edge of the power switch control signal Vout to generate the tracking clock signal Vt_clk.

Due to this, the transistor T5 is turned on at a falling edge of the power switch control signal Vout, so the tracking signal Vt has magnitude of the inverted sampling signal at the falling edge of the power switch control signal Vout. However, when the bleed switch on-off control signal has the high level, the transistor T6 is turned on, so the tracking signal Vt has the low level. That is, the tracking signal Vt has the low level in a duration when the bleed switch on-off control signal has the high level. The smaller the magnitude of the rectified AC signal V+ is, the larger the magnitude of the tracking signal Vt is in a duration when the bleed switch on-off control signal has the low level.

The amplifier 135 amplifies the tracking signal Vt with a gain of Rd/Rc to generate the bleed switch control signal Vg.

According to aspects of embodiments of the present invention, the efficiency of the AC-DC converter can be improved while the flicker of the LED lamp controlled by the TRIAC dimmer is prevented.

The embodiments of the present invention are not implemented only by a device and/or method, but can be implemented through a program for realizing functions corresponding to the configuration of the embodiments of the present invention and a recording medium having the program recorded thereon. These implementations can be realized by the ordinarily skilled person in the art from the description of the above-described embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A device for controlling a bleed switch, comprising:
a first controller for generating a first control signal having a first level in a first time duration and having a second level in a second time duration; and
a second controller for generating a second control signal by using the first control signal and providing the second control signal to the bleed switch,
wherein the bleed switch is turned off in the first time duration,
wherein the bleed switch is turned on in the second time duration, wherein magnitude of a current of a power switch in the first time duration is larger than magnitude of a current of the power switch in the second time duration, the power switch being coupled to a transformer of an AC-DC converter.

2. The device of claim 1, wherein the second control signal has a third level in the first time duration, has a fourth level in a third time duration within the second time duration, and has a fifth level in a fourth time duration within the second time duration.

3. The device of claim 2, wherein magnitude of a current of the power switch in the third time duration is larger than magnitude of a current of the power switch in the fourth time duration.

4. The device of claim 3, wherein magnitude of a current of the bleed switch in the fourth level is smaller than magnitude of a current of the bleed switch in the fifth level.

5. The device of claim 1, wherein the second controller comprises:
a sampler for sampling a voltage corresponding to a current of the power switch to output a sampling signal;
an inverter for inverting the sampling signal to generate an inverted signal; and
a third controller for generating the second control signal by using the first control signal and the inverted signal.

6. The device of claim 5, wherein the third controller comprises:
a clock generator for generating a clock signal by using a control signal of the power switch;
a tracker for generating a tracking signal, wherein the tracking signal has a third level when the first control signal has the first level and has a level of the sampling signal corresponding to an edge of the clock signal when the first control signal has the second level; and
an amplifier for amplifying the tracking signal to generate the second control signal.

7. The device of claim 5, wherein the sampling signal has a level corresponding to a current of the power switch just before the power switch is turned off when a condition of the power switch corresponds to a turn-off.

8. The device of claim 7, wherein the sampling signal has a level corresponding to a current of the power switch when a condition of the power switch corresponds to a turn-on.

9. A power supply, comprising:
a TRIAC dimmer; and
an AC-DC converter connected to the TRIAC dimmer, wherein the AC-DC converter comprises:
a transformer;
a power switch coupled to the transformer;
a bleed switch; and
a bleed switch controller for turning off the bleed switch in a first time duration and turning on the bleed switch in a second time duration, wherein magnitude of a current of the power switch in the first time duration is larger than magnitude of a current of the power switch in the second time duration.

10. The power supply of claim 9, wherein the bleed switch controller controls the bleed switch so that magnitude of a current of the bleed switch in a third time duration within the second time duration is smaller than magnitude of a current of the bleed switch in a fourth time duration within the second time duration.

11. The power supply of claim 10, wherein magnitude of a current of the power switch in the third time duration is larger than magnitude of a current of the power switch in the fourth time duration.

12. A method of driving a power supply of which consumption power is controlled by a TRIAC dimmer, wherein the power supply comprises a bleed switch, the method comprising:

generating a first control signal having a first level in a first time duration and having a second level in a second time duration;

generating a second control signal by using the first control signal; and providing the second control signal to the bleed switch, wherein the bleed switch is turned off in the first time duration, and wherein the bleed switch is turned on in the second time duration, wherein magnitude of a current of a power switch in the first time duration is larger than magnitude of a current of the power switch in the second time duration, the power switch being coupled to a transformer of an AC-DC converter.

13. The method of claim 12, wherein the second control signal has a third level in the first time duration, has a fourth level in a third time duration within the second time duration, and has a fifth level in a fourth time duration within the second time duration.

14. The method of claim 13, wherein magnitude of a current of the power switch in the third time duration is larger than magnitude of a current of the power switch in the fourth time duration.

15. The method of claim 14, wherein magnitude of a current of the bleed switch in the fourth level is smaller than magnitude of a current of the bleed switch in the fifth level.

16. The method of claim 15, wherein generating the second control signal comprises:

generating a sampling signal, wherein the sampling signal has a level corresponding to a current of the power switch just before the power switch is turned off when a condition of the power switch corresponds to a turn-off and has a level corresponding to a current of the power switch when a condition of the power switch corresponds to a turn-on;

inverting the sampling signal to generate an inverted signal;

generating a clock signal by using a control signal of the power switch;

generating a tracking signal, wherein the tracking signal has a third level when the first control signal has the first level, and has a level of the sampling signal corresponding to an edge of the clock signal when the first control signal has the second level; and amplifying the tracking signal to generate the second control signal.

* * * * *